(12) United States Patent
Kim et al.

(10) Patent No.: US 7,771,881 B2
(45) Date of Patent: Aug. 10, 2010

(54) FUEL SUPPLY UNIT FOR REFORMER AND FUEL CELL SYSTEM WITH THE SAME

(75) Inventors: Ju-Yong Kim, Suwon-si (KR); Dong-Uk Lee, Suwon-si (KR); Dong-Myung Suh, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 24 days.

(21) Appl. No.: 11/365,048

(22) Filed: Feb. 28, 2006

(65) Prior Publication Data

US 2006/0194084 A1 Aug. 31, 2006

(30) Foreign Application Priority Data

Feb. 28, 2005 (KR) .................. 10-2005-0016692

(51) Int. Cl.
*H01M 8/06* (2006.01)
*B01J 19/00* (2006.01)

(52) U.S. Cl. .................. 429/423; 429/434; 429/436; 429/433; 422/198

(58) Field of Classification Search .................. None
See application file for complete search history.

(56) References Cited

U.S. PATENT DOCUMENTS

| | | | | |
|---|---|---|---|---|
| 5,058,408 A | * | 10/1991 | Leftault et al. ............ | 72/56 |
| 6,649,289 B2 | * | 11/2003 | Hsu et al. ................ | 429/13 |
| 6,866,953 B2 | * | 3/2005 | Hiyoshi et al. ........... | 429/19 |
| 2002/0172853 A1 | * | 11/2002 | Kamo et al. ............. | 429/34 |
| 2003/0059654 A1 | * | 3/2003 | Hsu et al. ............... | 429/13 |
| 2004/0062961 A1 | * | 4/2004 | Sato et al. .............. | 429/19 |
| 2004/0247960 A1 | * | 12/2004 | Sato et al. .............. | 429/20 |

FOREIGN PATENT DOCUMENTS

| | | |
|---|---|---|
| JP | 01-253167 | * 10/1999 |
| JP | 2003-048701 | 2/2003 |
| JP | 2005-108657 | 4/2005 |
| JP | 2006-032040 | 2/2006 |

OTHER PUBLICATIONS

Office action dated Dec. 15, 2009 for corresponding Japanese Patent Application No. 2006-041820.

* cited by examiner

*Primary Examiner*—Dah-Wei Yuan
*Assistant Examiner*—Angela J. Martin
(74) *Attorney, Agent, or Firm*—Christie, Parker & Hale, LLP

(57) ABSTRACT

A fuel cell system includes an electricity generator for generating electric energy through a reaction of hydrogen and oxygen, a reformer for generating a reforming gas containing the hydrogen from a fuel through a catalytic reaction using thermal energy and for supplying the reforming gas to the electricity generator, a burner for generating the thermal energy and for supplying the thermal energy to the reformer, a fuel supply unit for supplying the fuel to the reformer, and an air supply unit for supplying air to the electricity generator. The fuel supply unit includes a main fuel tank for storing the fuel, at least one auxiliary fuel tank connected with the main fuel tank and the reformer, and a heating unit disposed in connection with the auxiliary fuel tank to heat the fuel stored in the auxiliary fuel tank.

29 Claims, 6 Drawing Sheets

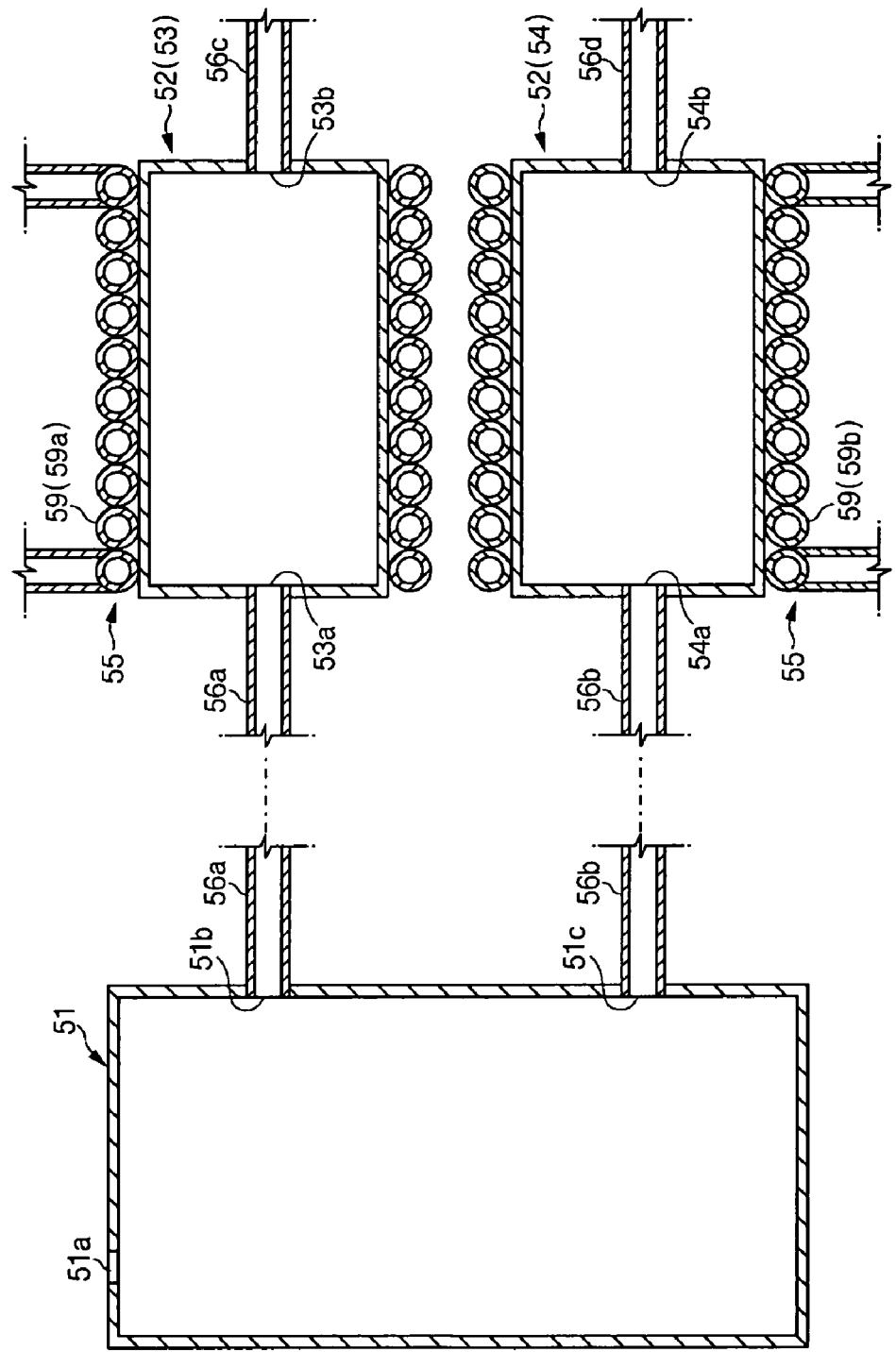

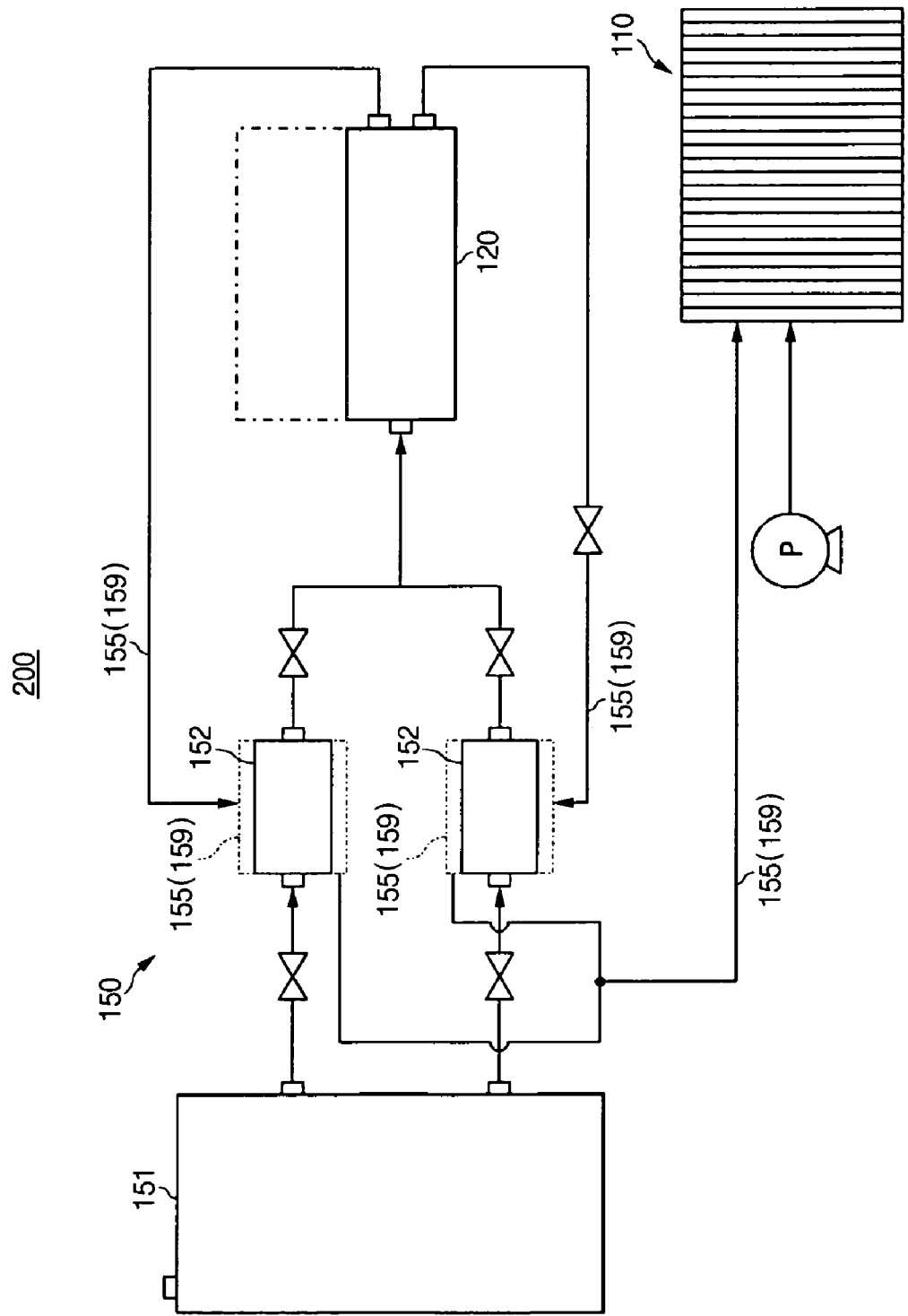

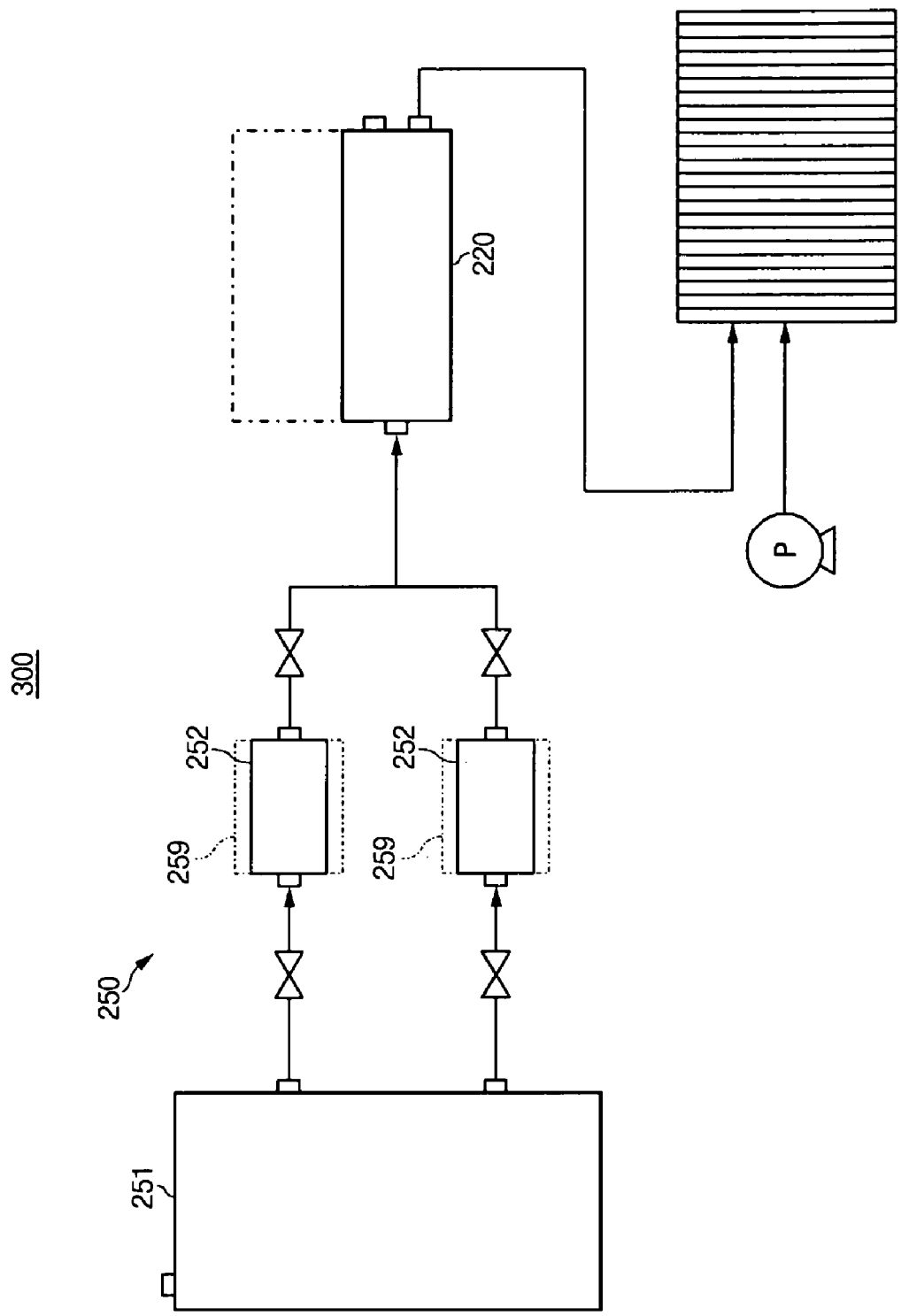

FUEL SUPPLY UNIT FOR REFORMER AND FUEL CELL SYSTEM WITH THE SAME

CROSS REFERENCE TO RELATED APPLICATION

This application claims priority to and the benefit of Korean Patent Application No. 10-2005-0016692, filed on Feb. 28, 2005, in the Korean Intellectual Property Office, the entire content of which is incorporated herein by reference.

BACKGROUND OF THE INVENTION (a) Field of the Invention

The present invention relates to a fuel cell system, and, more particularly, to a fuel cell system having a reformer.

(b) Description of the Related Art

A fuel cell system is an electricity generating system which directly converts chemical reaction energy of oxygen and hydrogen contained in a hydrocarbon material, such as methanol, ethanol, natural gas, etc., into electrical energy.

A polymer electrolyte membrane fuel cell (PEMFC) has been recently developed to have an excellent output characteristic, a low operating temperature, and fast starting and response characteristics. In addition, the PEMFC advantageously has a wide range of applications including a mobile power source for vehicles, a distributed power source for home or other buildings, and a small-size power source for electronic apparatuses.

A fuel cell system employing the PEMFC includes a stack, a reformer, a fuel tank, and a fuel pump. The stack constitutes an electricity generation assembly constructed with a plurality of unit cells, which generate electrical energy through a reaction of hydrogen and oxygen, and the fuel pump supplies the fuel of the fuel tank to the reformer. The reformer then absorbs thermal energy supplied by a burner, reforms the fuel through a catalytic reaction to generate a reforming gas containing hydrogen, and supplies the reforming gas to the stack.

However, in the fuel cell system employing the PEMFC, the fuel pump must operate in order to supply the fuel to the reformer. The power consumed for the operation becomes a parasitic power which needs to be generated in addition to a power for driving the whole fuel cell system. Therefore, there is a problem in that the parasitic power causes a decrease in performance and energy efficiency of the entire fuel cell system.

In addition, since the conventional fuel cell system requires a space for the fuel pump, there is a problem in that it is impossible to implement a compact fuel cell system.

In addition, in the conventional fuel cell system, since a fuel supplied to the reformer is preheated by a preheating unit, there is a problem in that the power consumption of the preheating causes a further deterioration in the performance of the entire fuel cell system.

SUMMARY OF THE INVENTION

An embodiment of the present invention provides a fuel supply unit for a reformer capable of supplying a fuel to the reformer with a simple structure thereof and a fuel cell system having the fuel supply unit.

An embodiment of the present invention provides a fuel cell system capable of preheating a fuel supplied to a reformer by using thermal energy generated from a burner or the reformer.

According to an embodiment of the present invention, there is provided a fuel supply unit for a reformer generating a reforming gas containing hydrogen from a fuel through a catalytic reaction using thermal energy supplied by a burner. The fuel supply unit includes a main fuel tank for storing the fuel, an auxiliary fuel tank connected with the main fuel tank and the reformer, and a heating unit disposed in connection with (or in contact with) the auxiliary fuel tank to heat the fuel stored in the auxiliary fuel tank.

In the above embodiment of the present invention, a volume of the main fuel tank may be larger than a volume of the auxiliary fuel tank.

In addition, the fuel stored in the auxiliary fuel tank to be supplied to the reformer may be heated by the heating unit.

In addition, the fuel stored in the main fuel tank may be supplied to the auxiliary fuel tank due to a difference between internal pressures of the main and auxiliary fuel tanks.

In addition, the auxiliary fuel tank may include first and second tanks which are connected with the main fuel tank.

In addition, the heating unit may be constructed with a heating wire which winds around an outer circumferential surface of the auxiliary fuel tank in a coil shape.

In addition, the heating unit may be constructed with a first path member which winds around an outer circumferential surface of the auxiliary fuel tank in a coil shape and allows a high temperature discharging gas discharged from the burner to pass through.

In addition, the heating unit may be constructed with a second path member which winds around an outer circumferential surface of the auxiliary fuel tank in a coil shape and allows a high temperature discharging gas discharged from the reformer to pass through.

According to another embodiment of the present invention, there is provided a fuel cell system. The fuel cell system includes an electricity generator which generates electric energy through a reaction of hydrogen and oxygen, a reformer which generates a reforming gas containing the hydrogen from a fuel through a catalytic reaction using thermal energy and supplies the reforming gas to the electricity generator, a burner which generates the thermal energy and supplies the thermal energy to the reformer, a fuel supply unit which supplies the fuel to the reformer, and an air supply unit which supplies air to the electricity generator, wherein the fuel supply unit includes a main fuel tank which stores the fuel, at least one auxiliary fuel tank which is connected with the main fuel tank and the reformer, and a heating unit which is disposed in connection with (or in contact with) the auxiliary fuel tank to heat the fuel stored in the auxiliary fuel tank.

In the above embodiment of the present invention, the fuel may be a gaseous fuel or a liquid fuel.

In addition, the burner may have a structure which generates the thermal energy through an oxidation reaction of a gaseous fuel and the air.

In addition, a volume of the main fuel tank may be larger than that of the auxiliary fuel tank.

In addition, the auxiliary fuel tank may include first and second tanks which are connected with the main fuel tank.

In addition, the main fuel tank and the first tank may be connected with each other through a first pipeline, and a first switching valve may be provided to the first pipeline.

In addition, the main fuel tank and the second tank may be connected with each other through a second pipeline, and a second switching valve may be provided to the second pipeline.

In addition, the first tank and the reformer may be connected with each other through a third pipeline, and a third switching valve may be provided to the third pipeline.

In addition, the second tank and the reformer may be connected with each other through a fourth pipeline, and a fourth switching valve may be provided to the fourth pipeline.

In addition, the heating unit may be constructed with a heating wire which winds around an outer circumferential surface of the auxiliary fuel tank in a coil shape.

In addition, the heating unit may be constructed with a first path member which winds around an outer circumferential surface of the auxiliary fuel tank in a coil shape and allows a high temperature discharging gas discharged from the burner to pass through. In this case, the first path member may be connected with a discharging portion of the burner.

In addition, the heating unit may be constructed with a second path member which winds around an outer circumferential surface of the auxiliary fuel tank in a coil shape and allows a high temperature discharging gas discharged from the reformer to pass through. In this case, a first side end of the second path member may be connected with a discharging portion of the reformer, and a second side end of the second path member may be connected with the electricity generator.

In addition, the air supply: unit may be an air pump.

In addition, the fuel cell system may include a stack having a structure which is constructed by stacking a plurality of the electricity generators.

BRIEF DESCRIPTION OF THE DRAWINGS

The accompanying drawings, together with the specification, illustrate exemplary embodiments of the present invention, and, together with the description, serve to explain the principles of the present invention.

FIG. 5 is a schematic cross-sectional view showing a structure of a fuel supply unit shown in FIG. 1;

FIG. 6 is a schematic block diagram showing an entire structure of a fuel cell system according to another embodiment of the present invention; and FIG. 7 is a schematic block diagram showing an entire structure of a fuel cell system according to still another embodiment of the present invention.

DETAILED DESCRIPTION

Figure 1:
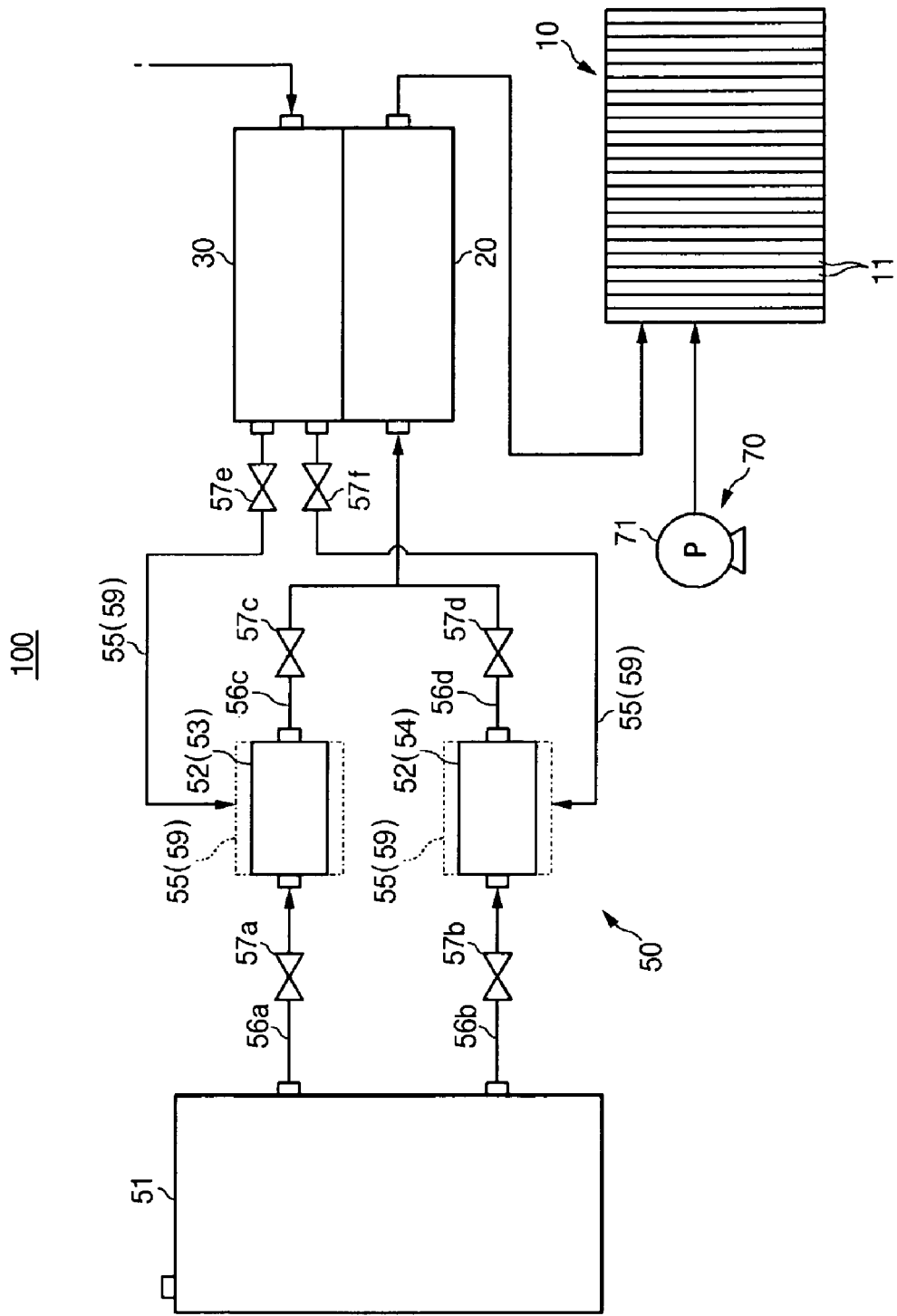
FIG. 1 is a schematic block diagram showing an entire structure of a fuel cell system according to an embodiment of the present invention.

FIG. 1 is a schematic block diagram showing a whole construction of a fuel cell system 100 according to an embodiment of the present invention.

Referring to FIG. 1, the fuel cell system 100 employs a polymer electrolyte member fuel cell (PEMFC) which reforms a fuel containing hydrogen to generate a reforming gas and performs a reaction of the reforming gas and an oxidant gas to generate electrical energy.

In the fuel cell system 100, the fuel used to generate electricity denotes a liquid or gaseous fuel containing hydrogen, such as methanol, ethanol, methane gas, propane gas, etc. In the embodiment, a liquid fuel is exemplified.

As the oxidant gas, an oxygen gas stored in a separate storage unit or air containing oxygen can be used. In the embodiment, air is exemplified.

The fuel cell system 100 includes a stack 10 having one or more electricity generators 11 for generating electrical energy through an electro-chemical reaction of the hydrogen and oxygen, a reformer 20 for generating the hydrogen from the aforementioned liquid fuel through a chemical catalytic reaction using thermal energy and for supplying the hydrogen to the electricity generators 11, a burner 30 for burning the liquid fuel with the air to generate the thermal energy and for supplying the thermal energy to the reformer 20, a fuel supply unit 50 for supplying the liquid fuel to the reformer 20, and an air supply unit 70 for supplying the air to the electricity generators 11.

Figure 2:
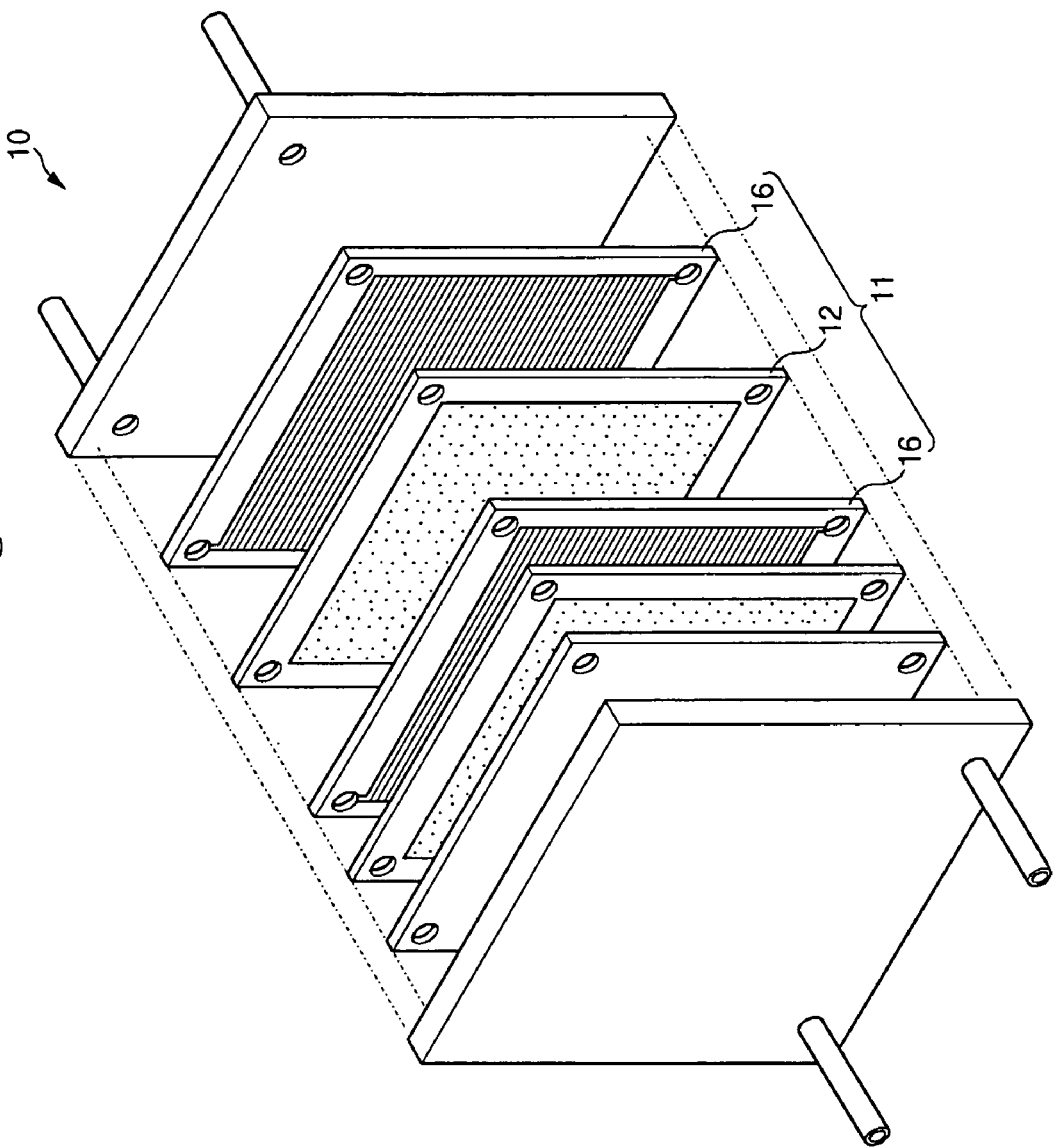
FIG. 2 is a perspective exploded view showing a structure of a stack shown in FIG. 1.

FIG. 2 is a perspective exploded view showing a structure of a stack shown in FIG. 1. Each of the electricity generators 11 constituting the stack 10 is a unit fuel cell (or a unit cell) including a membrane electrode assembly (MEA) 12 and separators (or bipolar plates) disposed in close contact with both surfaces of the membrane electrode assembly 12.

In the present invention, the stack 10 may have a structure constructed by sequentially disposing a plurality of the unit cells (i.e., the electricity generators 11) adjacent to one another.

The membrane electrode assembly 12 has an active region where the electro-chemical reaction of the hydrogen and the oxygen occurs and includes anode and cathode electrodes disposed on both sides thereof and an electrolyte membrane interposed between the electrodes.

In general, the stack 10 may be constructed with a stacked structure of a polymer electrolyte membrane fuel cell (PEMFC).

Figure 3:
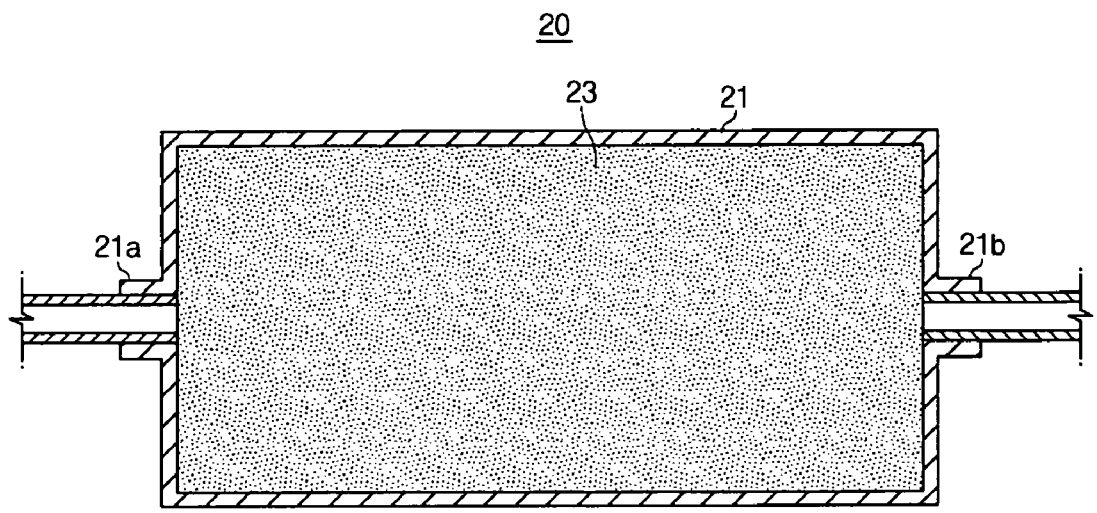
FIG. 3 is a schematic cross-sectional view showing a structure of a reformer shown in FIG. 1.

FIG. 3 is a schematic cross-sectional view showing a structure of the reformer 20 shown in FIG. 1. The reformer 20 employed in the present invention has a structure of a general reformer for generating a reforming gas from the aforementioned liquid fuel through a catalytic reaction using thermal energy, such as a steam reforming reaction, a partial oxidation reaction, and/or an auto-thermal reaction, and for supplying the reforming gas to one or more of the electricity generators 11 of the stack 10.

The reformer 20 may include a cylindrical reactor body 21 filled with a reforming catalyst 23 for precipitating the reforming reaction and has, for example, a pellet or honey comb shape.

The reactor body 21 has a first inlet 21a and a first outlet 21b. The liquid fuel supplied by the fuel supply unit 50 described in more detail later is injected into an inner portion of the reactor body 21 through the first inlet 21a, and a relatively high temperature reforming gas containing hydrogen generated through the reforming reaction of the fuel by using the reforming catalyst 23 in the reactor body 21 is discharged out through the second outlet 21b.

The first inlet 21a may be connected with the fuel supply unit 50 through a pipeline, and the first outlet 21b may be connected with one or more of the electricity generators 11 of the stack 10 through a pipeline.

The reformer 20 is not limited to a structure having the above-described cylindrical reactor body 21, and the reformer 20 may have a general plate-type reactor where a reforming catalyst layer is disposed on inner surfaces of channels formed on a reactor plate.

Figure 4:
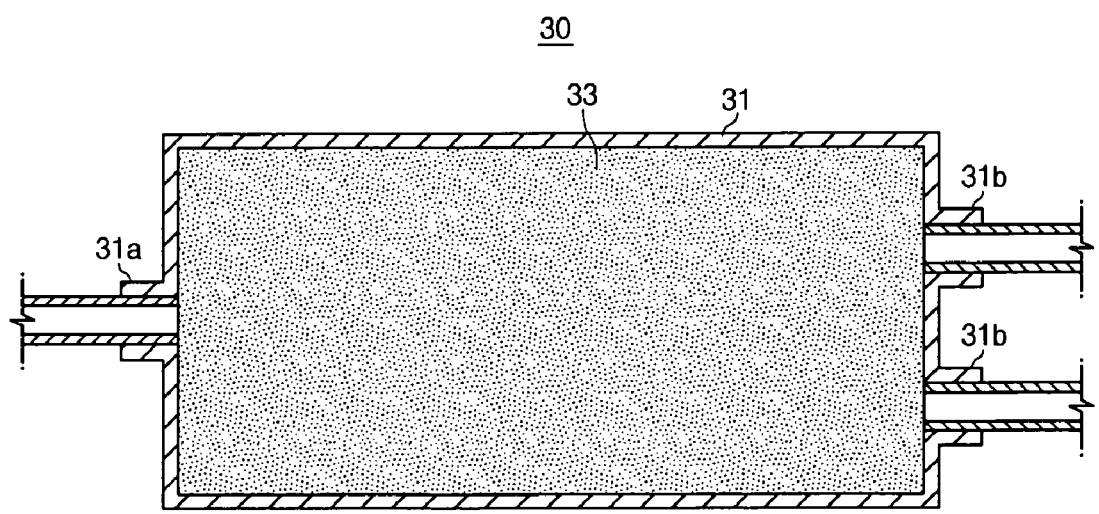
FIG. 4 is a schematic cross-sectional view showing a structure of a burner shown in FIG. 1.

FIG. 4 is a schematic cross-sectional view showing a structure of the burner 30 shown in FIG. 1. The burner 30 for supplying the thermal energy to the reformer 20 burns the gaseous fuel, such as methane gas, propane gas, etc., with the air to generate the terminal energy in a predetermined temperature range.

The burner 30 is connected with the reformer 20 to burn the gaseous fuel with the air through an oxidation reaction of the gaseous fuel and the air by using a catalyst. The burner 30 may include a cylindrical burner body 31 filled with a general oxidation catalyst 33 which has, for example, a pellet or honey comb shape.

The burner body 31 has a second inlet 31a and a second outlet 31b. The air and the gaseous fuel supplied by a separate fuel supply unit (not shown) are injected into an inner portion of the burner body 31 through the second inlet 31a, and a relatively high temperature combustion gas generated through an oxidation reaction of the air and the gaseous fuel by using the oxidation catalyst 33 in the burner body 31 is discharged out through the second outlet 31b. The second inlet 31a may be connected with the separate fuel supply unit (not shown) described above for supplying the gaseous fuel and the air, and the second outlet 31b may be connected with a first path member 59 described in more detail later.

The burner 30 is not limited to a structure having the above-described cylindrical burner body 31, and the burner 30 may include a general plate-type burner body where a reforming catalyst layer is disposed on inner surfaces of channels formed on the reactor plate. The burner 30 is not limited to a structure where an oxidation reaction using the aforementioned catalyst occurs, and the burner 30 may be. a general burner for igniting and burning the gaseous fuel with the air by using a separate igniter to generate the thermal energy.

Referring back to FIG. 1, in the embodiment, the air supply unit 70 includes an air pump 71 for pumping-in the air and supplying the air to one or more of the electricity generators 11 of the stack 10. In this case, the air pump 71 is connected with the stack 10 through a pipeline.

The air supply unit 70 is not limited to a structure having a pump, and the air supply unit 70 may have a general fan, a blower, etc.

Now, the fuel supply unit 50 of the fuel cell system 100 according to embodiments of the present invention will be described in more detail with reference to the accompanying drawings.

FIG. 5 is a schematic cross-sectional view showing a structure of the fuel supply unit 50 according to an embodiment of the present invention.

Referring to FIG. 5, the fuel supply unit 50 includes a main fuel tank 51 for storing the liquid fuel, at least one auxiliary fuel tank 52 connected with the main fuel tank 51 and the reformer 20 to receive a predetermined amount of fuel and for storing the fuel, and a heating unit 55 disposed in contact with the auxiliary fuel tank 52 to heat the fuel stored in the auxiliary fuel tank 52.

The main fuel tank 51 has a storage space having a predetermined volume capable of storing the liquid fuel. The main fuel tank 51 has a single inlet 51a through which the liquid fuel is injected into the storage space and first and second outlets 51b and 51c through which the fuel stored in the storage space is discharged out. The first and second outlets 51b and 51c may be connected with the auxiliary fuel tank 52 in more detail described later.

The auxiliary fuel tank 52 has a storage space capable of storing a predetermined amount of the fuel stored in the main fuel tank 51. The auxiliary fuel tank 52 has a first tank 53 which is connected with the first outlet 51b of the main fuel tank 51 and a second tank 54 which is connected with the second outlet 51c.

The first and second tanks 53 and 54 provide a storage space having a volume which is smaller than that of the main fuel tank 51. The first tank 53 has a first inlet 53a through which the liquid fuel is injected into the storage space and a first outlet 53b through which the fuel stored in the storage space is discharged out.

The second tank 54 has a second inlet 54a through which the liquid fuel is injected into the storage space and a second outlet 54b through which the fuel stored in the storage space is discharged out.

The first outlet 51b of the main fuel tank 51 and the first inlet 53a of the first tank 53 may be connected with each other through a first pipeline 56a. The second outlet 51c of the main fuel tank 51 and the second inlet 54a and the second tank 54 may be connected with each other through a second pipeline 56b. The first outlet 53b of the first tank 53 and the first inlet 21a of the reformer 20 may be connected with each other through a third pipeline 56c. The second outlet 54b of the second tank 54 and the first inlet 21a of the reformer 20 may be connected with each other through a fourth pipeline 56d. Here, in one embodiment of the invention, the third and fourth pipelines 56c and 56d are formed in a shape of a confluence pipe to be connected with the first inlet 21a of the reformer 20.

In addition, the first pipeline 56a is provided with a first switching valve 57a for substantially opening and closing the first outlet 51b of the main fuel tank 51 (see FIG. 1). The second pipeline 56b is provided with a second switching valve 57b for substantially opening and closing the second outlet 51c of the main fuel tank 51 (see FIG. 1). The third pipeline 56c is provided with a third switching valve 57c for substantially opening and closing the first outlet 53b of the first tank 53 (see FIG. 1). The fourth pipeline 56d is provided with a fourth switching valve 57d for substantially opening and closing the second outlet 54b of the second tank 54 (see FIG. 1).

Here, each of the switching valves 57a, 57b, 57c, and 57d may be a general check valve for selectively opening and closing each of the pipelines 56a, 56b, 56c, and 56d according to internal pressures of the first and second tanks 53 and 54.

More specifically, when the internal pressure of the first tank 53 exceeds a pressure value (that may be predetermined), the first switching valve 57a closes the first pipeline 56a, and the third switching valve 57c opens the third pipeline 56c. By contrast, when the internal pressure of the first tank 53 does not exceed the pressure value, the first switching valve 57a opens the first pipeline 56a, and the third switching valve 57c closes the third pipeline 56c.

Similarly, when the internal pressure of the second tank 54 exceeds a pressure value (that may be predetermined), the second switching valve 57b closes the second pipeline 56b, and the fourth switching valve 57d opens the fourth pipeline 56d. By contrast, when the internal pressure of the second tank 54 does not exceed the pressure value, the second switching valve 57b opens the second pipeline 56b, and the fourth switching valve 57d closes the fourth pipeline 56d.

According to the embodiment, the heating unit 55 for heating the first and second tanks 53 and 54 expands a volume of the fuel so as to supply the fuel to the reformer 20 and generates a difference between the internal pressures of the first and second tanks 53 and 54 to supply the fuel stored in the main fuel tank 51 to the first and second tanks 53 and 54.

The heating unit 55 is connected with the second outlet 31b of the burner body 31 and includes a first path member 59 disposed in contact with outer circumferential surfaces of the first and second tanks 53 and 54. The first path member 59 is constructed with a pipe through which a relatively high temperature combustion gas discharged from the second outlet 31b passes through, and the pipe winds around the outer circumferential surfaces of the first and second tanks 53 and 54. Here, a first side end of the first path member 59 is connected with the first outlet 31b of the burner body, and a second side end thereof is connected with an external portion. Portions of the first path member 59 corresponding to the first and second tanks 53 and 54 are respectively provided with fifth and sixth switching valves 57e and 57f which are controlled by a general control unit (not shown) to selectively open and close the first path member 59 (see FIG. 1).

As such, the first path member 59 allows the combustion gas to pass through the first path member 59 to outer circumferential surfaces of the first and second tanks 53 and 54 through the use of the fifth and sixth switching valves 57e and 57f. Hereinafter, for a better understanding thereof, the first path member 59 allowing the combustion gas to the outer circumferential surface of the first tank 53 is referred to as a first path 59a, and the first path member 59 allowing the combustion gas to the outer circumferential surface of the second tank 54 is referred to as a second path 59b.

Accordingly, when passing through the first path 59a, the combustion gas heats the fuel stored in the first tank 53, and when passing through the second path 59b, the combustion gas heats the fuel stored in the second tank 54.

Now, operations of the fuel cell system according to an embodiment of the present invention will be described in more detail.

Firstly, the storage space of the main fuel tank 51 is filled with a sufficient amount of the liquid fuel. At this time, the first and second switching valves 57a and 57b open the first and second pipelines 56a and 56b, and the third and fourth switching valves 57c and 57d close the third and fourth pipelines 56c and 56d. Therefore, the fuel stored in the main fuel tank 51 is supplied to the storage space of the first and second tanks 53 and 54 through the first and second pipelines 56a and 56b, so that an amount of the fuel (that may be predetermined) is stored in the storage space.

During the above operation, the burner 30 burns the gaseous fuel supplied from a separate fuel supply unit (not shown) with the air through the oxidation reaction using the oxidation catalyst 33 to generate the thermal energy in a temperature range (that may be predetermined) and supplies the thermal energy to the reformer 20. At this time, the control unit controls the fifth switching valve 57e to open the first path 59a and the sixth switching valve 57f to close the second path 59b.

In this case, the burner body 31 discharges the combustion gas at a relatively high temperature through the second outlet 31b. When passing through the first path 59a, the combustion gas heats the fuel stored in the first tank 53.

Due to the heat supplied from the combustion gas, the fuel stored in the first tank 53 expands, so that the internal pressure of the first tank 53 may exceeds a pressure (that may be predetermined).

After that, the first switching valve 57a closes the first pipeline 56a, and the third switching valve 57c opens the third pipeline 56c, so that the heated fuel is injected into the reactor body 21 of the reformer 20 through the third pipeline 56c.

When all the fuel stored in the first tank 53 is supplied to the reactor body 21, the internal space of the first tank 53 is in a vacuum state. After that, the first switching valve 57a opens the first pipeline 56a, and the third switching valve 57c closes the third pipeline 56c. Due to a difference between the internal pressures of the main fuel tank 51 and the first tank 53, the fuel stored in the main fuel tank 51 is supplied into the first tank 53 through the first pipeline 56a. At this time, the control unit controls the fifth switching valve 57e to close the first path 59a.

In this state, the control unit controls the sixth switching valve 57f open the second path 59b. Therefore, the combustion gas discharged from the second outlet 31b of the burner body 31 passes through the second path 59c, so that the fuel stored in the second tank 54 is heated.

Due to the heat supplied from the combustion gas, the fuel stored in the second tank 54 expands, so that the internal pressure of the second tank 54 may exceed a pressure (that may be predetermined).

After that, the second switching valve 57b closes the second pipeline 56b, and the fourth switching valve 57d opens the fourth pipeline 56d, so that the heated fuel is injected into the reactor body 21 of the reformer 20 through the fourth pipeline 56d.

Similar to the operation of the first tank 53, when all the fuel stored in the second tank 54 is supplied to the reactor body 21, the internal space of the second tank 54 is in a vacuum state. After that, the second switching valve 57b opens the second pipeline 56b, and the fourth switching valve 57d closes the fourth pipeline 56d. Due to a difference between the internal pressures of the main fuel tank 51 and the second tank 54, the fuel stored in the main fuel tank 51 is supplied into the second tank 54 through the second pipeline 56b. At this time, the control unit controls the sixth switching valve 57f to close the second path 59b.

In this state, the control unit controls the fifth switching valve 57e to open the first path 59a again. Therefore, the combustion gas discharged from the second outlet 31b of the burner body 31 passes through the first path 59a, so that the fuel stored in the first tank 53 is heated. The following operations are substantially the same as the aforementioned operations, and thus, a detailed description thereof is omitted.

As such, through a series of the aforementioned operations, the fuel stored in the main fuel tank 51 is preheated up to a temperature (that may be predetermined) by the thermal energy of the combustion gas discharged from the burner body 31 and supplied into the reactor body 21 of the reformer 20.

The reformer 20 absorbing the thermal energy supplied by the burner 30 generates the reforming gas containing the hydrogen from the fuel through the reforming reaction using the reforming catalyst 33 and supplies the reforming gas to one or more of the electricity generators 11 of the stack 10.

At the same time, the control unit operates the air pump 71 to supply the air to the electricity generator 11 of the stack 10.

Next, the reforming gas is supplied through the separators 16 of the electricity generator 11 to the anode electrode of the membrane electrode assembly 12. In addition, the air is supplied through the separators 16 of the electricity generator 11 to the cathode electrode of the membrane electrode assembly 12.

In the anode electrode, the reforming gas is decomposed into electrons and protons (hydrogen ions) through an oxidation reaction of the hydrogen. The protons pass through the electrolyte membrane of the membrane electrode assembly 12 to the cathode electrode, and the electrons cannot pass through the electrolyte membrane. As such, the electrons move through the separators 16 or a separate port (not shown) to the cathode electrode of the adjacent membrane electrode assembly 12. As a result, the flow of the electrons generates a current. In addition, in the cathode electrode, heat (in a temperature that may be predetermined) and moisture are generated through a reduction reaction of the hydrogen ions moving to the cathode electrode through the electrolyte membrane with the oxygen contained in the air.

Accordingly, the fuel cell system 100 according to the present invention can supply an output of electrical energy (that may be predetermined) to a load such as a laptop computer, a portable electronic apparatus, a mobile communication terminal, etc.

FIG. 6 is a schematic block diagram showing an entire structure of a fuel cell system 200 according to another embodiment of the present invention.

Referring to FIG. 6, the fuel cell system 200 includes a fuel supply unit 150 for heating a fuel stored in an auxiliary tank 152 by using a high temperature reforming gas containing hydrogen discharged from a reformer 120 to supply a fuel stored in a main fuel tank 151 to the reformer 120.

The fuel supply unit 150 includes a heating unit 155 which is constructed by disposing a second path member 159 through which the reforming gas passes in contact with an outer circumferential surface of the auxiliary fuel tank 152.

In the embodiment, the second path member 159 may be constructed with a pipe which winds around the outer circumferential surface of the auxiliary fuel tank 152 in a coil shape. A first side end of the second path member 159 is connected with a hydrogen outlet (not shown) of the reformer 120, and a second side end thereof is connected with a stack 110.

Accordingly, in the fuel cell system 200 according to the present invention, during the operation of the system, the high temperature reforming gas containing hydrogen discharged form the reformer 120 passes through the second path member 159 to heat the fuel stored in the auxiliary fuel tank 152, so that the fuel stored in the main fuel tank 151 can be supplied in a preheated state to the reformer 120 by using the operations of the above-described embodiments.

FIG. 7 is a schematic block diagram showing an entire structure of a fuel cell system 300 according to still another embodiment of the present invention.

Referring to FIG. 7, the fuel cell system 300 includes a fuel supply unit 250 which heats a fuel stored in an auxiliary fuel tank 252 by using a heating wire 259 which winds around an outer circumferential surface of the auxiliary fuel tank 252.

The heating wire 259 has an electric resistance (that may be predetermined) to generate thermal energy by using an electric power (that may be predetermined) supplied from a control unit.

Accordingly, the fuel cell system 300 according to the embodiment heats the fuel stored in the auxiliary fuel tank 252 by using the heating wire 259, so that a fuel stored in a main fuel tank 251 can be supplied in a preheated state to a reformer 220 by using the operations of the above-described embodiments.

Unlike a conventional fuel cell system, a fuel cell system according to an embodiment of the present invention does not require a fuel pump for supplying a fuel to a reformer, so that a parasitic power for operating the entire system can be reduced. Accordingly, it is possible to improve performance of the fuel cell system and reduce a size thereof.

In addition, a fuel cell system according to an embodiment of the present invention can preheat a fuel supplied to a reformer by using thermal energy generated from a burner or the reformer, so that a thermal load for preheating the fuel can be reduced. Accordingly, it is possible to reduce energy loss and further improve energy efficiency and performance of the entire fuel cell system.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A fuel supply unit for a reformer for generating a reforming gas containing hydrogen from a fuel through a catalytic reaction using thermal energy supplied by a burner, comprising:
    a main fuel tank for storing the fuel;
    an auxiliary fuel tank connected between the main fuel tank and the reformer; and
    a heating unit in connection with the auxiliary fuel tank to heat the fuel stored in the auxiliary fuel tank,
    wherein the heating unit is around an outer circumferential surface of the auxiliary fuel tank in a coil shape;
    wherein the connection between the main fuel tank and the auxiliary fuel tank and the connection between the auxiliary fuel tank and the reformer are configured to open and close according to an internal pressure of the auxiliary fuel tank; and
    wherein the connection between the main fuel tank and the auxiliary fuel tank is configured to be open when the connection between the auxiliary fuel tank and the reformer is closed, and configured to be closed when the connection between the auxiliary fuel tank and the reformer is open.

2. The fuel supply unit of claim 1, wherein a volume of the main fuel tank is larger than a volume of the auxiliary fuel tank.

3. The fuel supply unit of claim 2, wherein the fuel stored in the auxiliary fuel tank to be supplied to the reformer is heated by the heating unit.

4. The fuel supply unit of claim 3, wherein the fuel stored in the main fuel tank is supplied to the auxiliary fuel tank due to a difference between an internal pressure of the main fuel tank and the internal pressure of the auxiliary fuel tank.

5. The fuel supply unit of claim 1, wherein the auxiliary fuel tank comprises first and second tanks, and wherein the first and second tanks are connected with the main fuel tank.

6. The fuel supply unit of claim 1, wherein the heating unit is constructed with a heating wire winding around the outer circumferential surface of the auxiliary fuel tank.

7. The fuel supply unit of claim 1, wherein the heating unit is constructed with a path member winding around the outer circumferential surface of the auxiliary fuel tank and allowing a high temperature discharging gas discharged from the burner to pass through.

8. The fuel supply unit of claim 1, wherein the heating unit is constructed with a path member winding around the outer circumferential surface of the auxiliary fuel tank and allowing a high temperature discharging gas discharged from the reformer to pass through.

9. A fuel cell system comprising:
    an electricity generator for generating electric energy through a reaction of hydrogen and oxygen;
    a reformer for generating a reforming gas containing the hydrogen from a fuel through a catalytic reaction using thermal energy and for supplying the reforming gas to the electricity generator;
    a burner for generating the thermal energy and for supplying the thermal energy to the reformer;
    a fuel supply unit for supplying the fuel to the reformer; and
    an air supply unit for supplying air to the electricity generator,
    wherein the fuel supply unit comprises:
        a main fuel tank for storing the fuel;
        at least one auxiliary fuel tank connected between the main fuel tank and the reformer;
        a first switching valve between the main fuel tank and the at least one auxiliary fuel tank;

a second switching valve between the at least one auxiliary fuel tank and the reformer; and a heating unit in connection with the at least one auxiliary fuel tank to heat the fuel stored in the at least one auxiliary fuel tank;

wherein the first switching valve and the second switching valve are configured to open and close according to an internal pressure of the auxiliary fuel tank; and wherein the first switching valve is configured to be open when the second switching valve is closed, and configured to be closed when the second switching valve is open.

10. The fuel cell system of claim 9, wherein the fuel is a liquid fuel.

11. The fuel cell system of claim 9, wherein the burner has a structure for generating the thermal energy through an oxidation reaction of a gaseous fuel and the air.

12. The fuel cell system of claim 9, wherein a volume of the main fuel tank is larger than a volume of the at least one the auxiliary fuel tank.

13. The fuel cell system of claim 12, wherein the at least one auxiliary fuel tank comprises first and second tanks, and wherein the first and the second tanks are connected with the main fuel tank.

14. The fuel cell system of claim 13, wherein the main fuel tank and the first tank are connected with each other through a first pipeline, and a first switching valve is provided to the first pipeline.

15. The fuel cell system of claim 14, wherein the main fuel tank and the second tank are connected with each other through a second pipeline, and a second switching valve is provided to the second pipeline.

16. The fuel cell system of claim 15, wherein the first tank and the reformer are connected with each other through a third pipeline, and a third switching valve is provided to the third pipeline.

17. The fuel cell system of claim 16, wherein the second tank and the reformer are connected with each other through a fourth pipeline, and a fourth switching valve is provided to the fourth pipeline.

18. The fuel cell system of claim 13, wherein the main fuel tank and the second tank are connected with each other through a pipeline, and a switching valve is provided to the pipeline.

19. The fuel cell system of claim 13, wherein the first tank and the reformer are connected with each other through a first pipeline, and a first switching valve is provided to the first pipeline.

20. The fuel cell system of claim 19, wherein the second tank and the reformer are connected with each other through a second pipeline, and a second switching valve is provided to the second pipeline.

21. The fuel cell system of claim 9, wherein the heating unit is constructed with a heating wire winding around an outer circumferential surface of the at least one auxiliary fuel tank in a coil shape.

22. The fuel cell system of claim 9, wherein the heating unit is constructed with a first path member winding around an outer circumferential surface of the at least one auxiliary fuel tank in a coil shape and allowing a high temperature discharging gas discharged from the burner to pass through.

23. The fuel cell system of claim 22, wherein the first path member is connected with a discharging portion of the burner.

24. The fuel cell system of claim 9, wherein the heating unit is constructed with a path member winding around an outer circumferential surface of the at least one auxiliary fuel tank in a coil shape and allowing a high temperature discharging gas discharged from the reformer to pass through.

25. The fuel cell system of claim 24, wherein a first side end of the path member is connected with a discharging portion of the reformer, and a second side end of the path member is connected with the electricity generator.

26. The fuel cell system of claim 9, wherein the air supply unit is an air pump.

27. The fuel cell system of claim 9, wherein the electricity generator comprises a plurality of electricity generators, the fuel cell system further comprising a stack having a structure constructed by stacking the plurality of the electricity generators.

28. The fuel supply unit of claim 1, wherein the auxiliary fuel tank is connected between the main fuel tank and the reformer such that the fuel is provided to the reformer from the main fuel tank through the auxiliary fuel tank.

29. The fuel supply unit of claim 28, wherein a volume of the main fuel tank is larger than a volume of the auxiliary fuel tank, wherein the fuel stored in the auxiliary fuel tank to be supplied to the reformer is heated by the heating unit, and wherein the fuel stored in the main fuel tank is supplied to the auxiliary fuel tank due to a difference between an internal pressure of the main fuel tank and the internal pressure of the auxiliary fuel tank.

* * * * *

UNITED STATES PATENT AND TRADEMARK OFFICE
CERTIFICATE OF CORRECTION

PATENT NO. : 7,771,881 B2  
APPLICATION NO. : 11/365048  
DATED : August 10, 2010  
INVENTOR(S) : Ju-Yong Kim et al.

Page 1 of 1

It is certified that error appears in the above-identified patent and that said Letters Patent is hereby corrected as shown below:

In the Claims

Column 11, Claim 12, line 19     After "one" delete "the"

Signed and Sealed this  
Eighth Day of November, 2011

David J. Kappos  
*Director of the United States Patent and Trademark Office*